US008601102B1

(12) United States Patent
Lee et al.

(10) Patent No.: US 8,601,102 B1
(45) Date of Patent: Dec. 3, 2013

(54) DYNAMIC ACCESS MANAGEMENT FOR NETWORK SECURITY

(75) Inventors: Chi-Cheng Lee, Cupertino, CA (US); Arvind Gopalan, Hacienda Heights, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2047 days.

(21) Appl. No.: 11/421,294

(22) Filed: May 31, 2006

(51) Int. Cl.
*G06F 15/173* (2006.01)
*G06F 15/16* (2006.01)

(52) U.S. Cl.
USPC ............ 709/223; 709/225; 709/228; 709/229

(58) Field of Classification Search
USPC ........................................................ 709/223
See application file for complete search history.

(56) References Cited

U.S. PATENT DOCUMENTS

| | | | |
|---|---|---|---|
| 7,010,807 B1 * | 3/2006 | Yanovsky | 726/24 |
| 7,788,369 B2 * | 8/2010 | McAllen et al. | 709/224 |
| 8,104,077 B1 * | 1/2012 | Gauvin et al. | 726/12 |
| 2002/0029280 A1 * | 3/2002 | Holden et al. | 709/229 |
| 2003/0055994 A1 * | 3/2003 | Herrmann et al. | 709/229 |
| 2003/0131113 A1 * | 7/2003 | Reeves et al. | 709/229 |
| 2003/0234808 A1 * | 12/2003 | Huang et al. | 345/735 |
| 2004/0049699 A1 * | 3/2004 | Griffith et al. | 713/201 |
| 2004/0167984 A1 * | 8/2004 | Herrmann | 709/229 |
| 2005/0268335 A1 * | 12/2005 | Le et al. | 726/13 |
| 2005/0278775 A1 * | 12/2005 | Ross | 726/2 |
| 2009/0037594 A1 * | 2/2009 | Sever et al. | 709/230 |
| 2013/0152161 A1 * | 6/2013 | Onno et al. | 726/1 |

* cited by examiner

*Primary Examiner* — Ario Etienne
*Assistant Examiner* — Blake Rubin
(74) *Attorney, Agent, or Firm* — Harrity & Harrity, LLP

(57) ABSTRACT

A method for managing access to network resources by a first network device may include establishing a communication session with the first network device. The method may also include receiving information from the first network device during the communication session, the information indicating that the first network device is not in compliance with at least one security-related rule. The method may further include determining whether to modify access by the first network device to at least one of the network resources based on the received information.

27 Claims, 5 Drawing Sheets

US 8,601,102 B1

DYNAMIC ACCESS MANAGEMENT FOR NETWORK SECURITY

BACKGROUND

1. Field of the Invention

Implementations consistent with the principles of the invention relate generally to access management and, more particularly, to providing dynamic access management.

2. Description of Related Art

Attacks on networks and unauthorized access to network resources have become an increasing problem for entities that are responsible for maintaining network security and providing access to network resources to a number of users. For example, an attack originating from a single user/node may result in a network being unable to provide legitimate users with the desired services and may even result in the network crashing.

As a result, network security devices typically limit access to network resources based on various authentication procedures designed to limit access to only authorized users. Even with such security measures, however, network attacks often occur.

For example, a client device may gain access to a network based on an authentication procedure performed at the time that the client device initiates contact with a network security device. One problem with granting access to a client device in this manner is that no further security monitoring is performed after a client has gained access to the network. That is, in conventional systems, once a client session is established, the network security device performs no additional monitoring of the client device. As a result, client device changes, including those that may adversely impact network security, are undetected.

SUMMARY

According to one aspect, a method for managing access to network resources by a first network device includes establishing a communication session with the first network device. The method also includes receiving information from the first network device during the communication session, the information indicating that the first network device is not in compliance with at least one security-related rule. The method further includes determining whether to modify access by the first network device to at least one of the network resources based on the received information.

According to another aspect, a system may include a memory configured to store security-related rules. The system may also include a processor coupled to the memory, where the processor is configured to establish a client session with a first client device. The processor is also configured to receive information from the first client device during the client session, the information indicating that the first client device is not in compliance with at least one security-related rule stored in the memory or that the configuration of the first client device has changed. The processor may be further configured to determine whether to modify access by the first client device to at least one resource based on the received information and the information stored in the memory.

According to a further aspect, a network device includes processing logic configured to establish a client-server session with a server. The processing logic is also configured to periodically scan the network device during the client-server session to identify a status associated with at least one of hardware or software included on the network device, where the periodic scanning is triggered by the network device. The processing logic is further configured to report the status associated with the network device to the server.

According to still another aspect, a computer-readable medium having stored thereon sequences of instructions which, when executed by a processor, cause the processor to establish a communication session with a server controlling access to a plurality of resources. The instructions also cause the processor to periodically scan a network device on which the processor is located during the communication session to identify a status associated with at least one of hardware or software included on the network device, where the periodic scanning is triggered by the network device and not by a command from the server. The instructions further cause the processor to report the status associated with the network device to the server.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Exemplary Network

Figure 1:
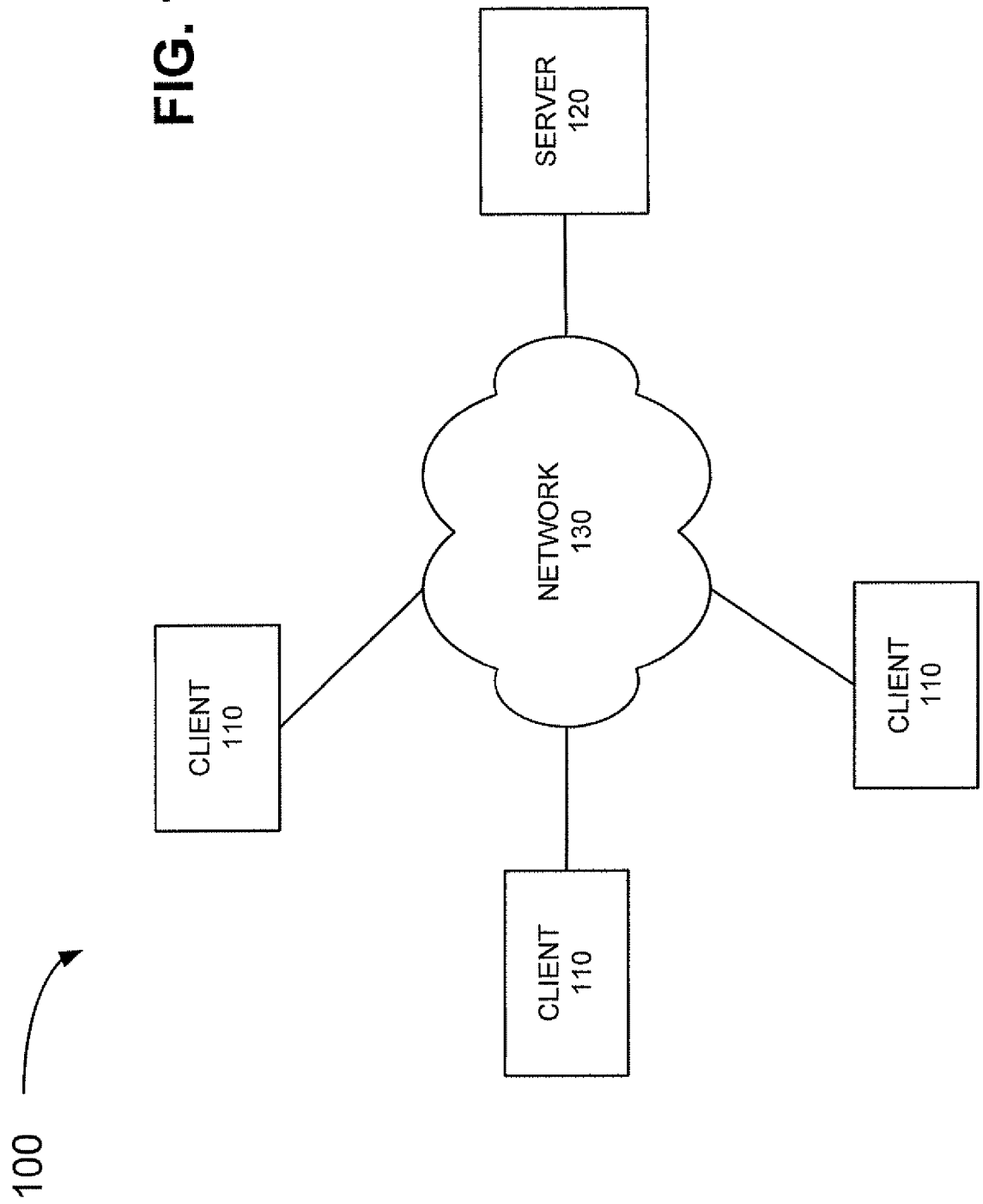
FIG. 1 is a diagram of an exemplary network in which systems and methods consistent with the principles of the invention may be implemented.

FIG. 1 is a diagram of an exemplary network 100 in which systems and methods consistent with the principles of the invention may be implemented. Network 100 may include clients 110, server 120 and network 130. The exemplary configuration illustrated in FIG. 1 is provided for simplicity. It should be understood that a typical network may include more or fewer devices than illustrated in FIG. 1. In addition, other devices that facilitate communications between the various entities illustrated in. FIG. 1 may also be included in network 100.

Clients 110 may each include a device, such as a personal computer, a laptop computer, a personal digital assistant (PDA), a web-based appliance, a wireless telephone or another type of computation or communication device, or a process running on one of these devices. Clients 110 may communicate with server 120 over network 130 via wired, wireless or optical connections.

Server 120 may include a server/computing device, or a set of servers/computing devices, that provides clients 110 with access to various network resources. In some implementations, the network resources reside on server 120. In other implementations, the network resources may be located externally with respect to server 120 (not shown in FIG. 1). Server 120 may authenticate clients 110 and check the configuration of clients 110 to determine whether to grant access. Server 120, consistent with the invention, may also dynamically monitor clients 110 after a client session is established to ensure client 110 compliance with various security-related rules, as described in detail below.

Network 130 may include one or more networks, such as a local area network (LAN) or a private network, such as a company network or intranet. Network 130 may also include a wide area network (WAN), a metropolitan area network (MAN), a telephone network, such as the Public Switched Telephone Network (PSTN), the Internet, a cellular network, a satellite network, another type of network or a combination of networks.

Exemplary Device Architecture

Figure 2:
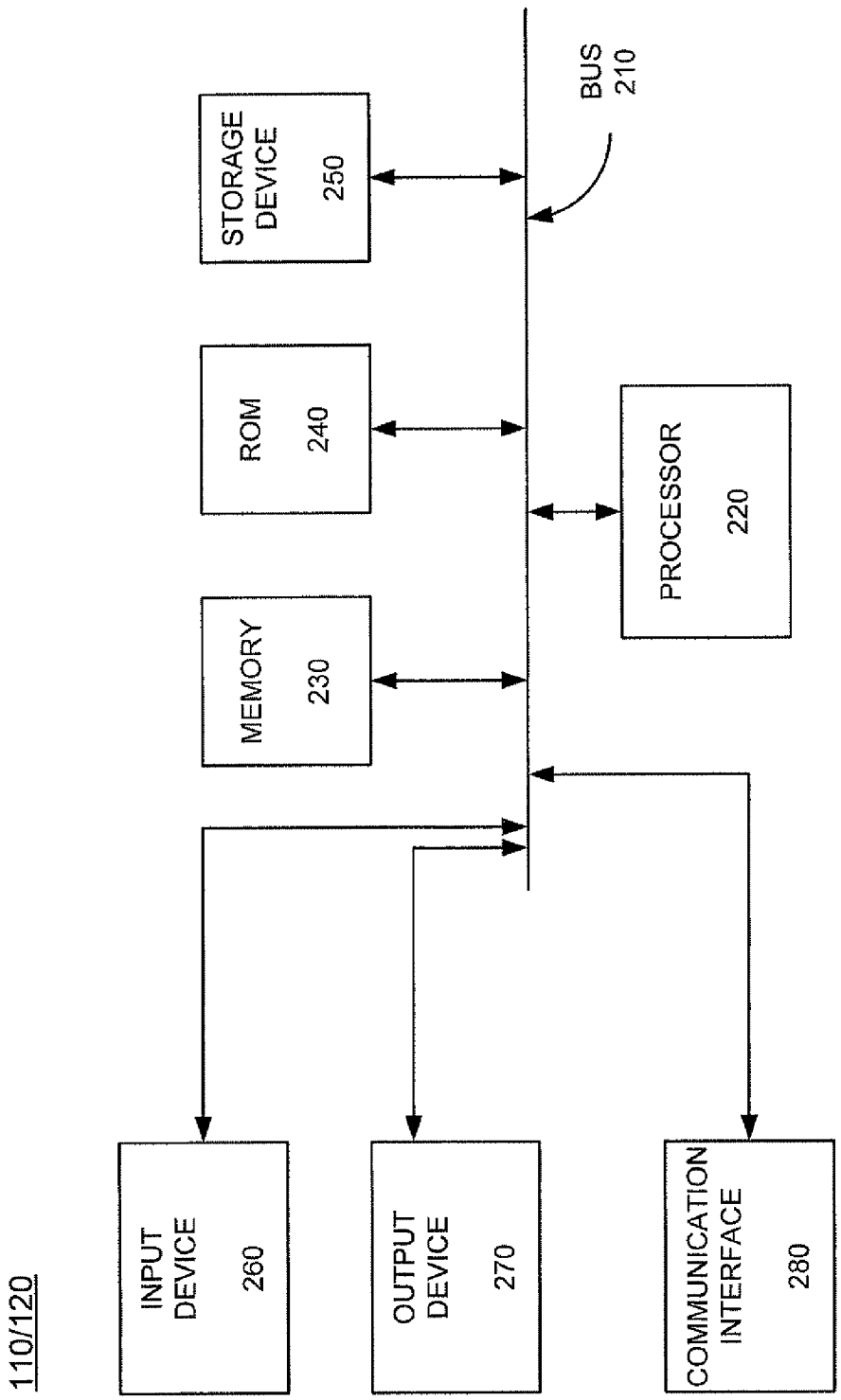
FIG. 2 is a block diagram illustrating an exemplary configuration of a client and the server of FIG. 1 consistent with the principles of the invention.

FIG. 2 illustrates an exemplary configuration of each of clients 110 and server 120 in an implementation consistent with principles of the invention. Client 110 and server 120 may each include a bus 210, a processor 220, a main memory 230, a read only memory (ROM) 240, a storage device 250, an input device 260, an output device 270, and a communication interface 280. Bus 210 may include a path that permits communication among the elements of client 110/server 120.

Processor 220 may include a processor, microprocessor, or processing logic that may interpret and execute instructions. Memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to client 110/server 120, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables client 110/server 120 to communicate with other devices and/or systems. For example, communication interface 280 may include a modem or an Ethernet interface to a LAN. Alternatively, communication interface 280 may include other mechanisms for communicating via a network, such as network 130.

Client 110, consistent with the principles of the invention, may perform processing associated with user access management, as described in detail below. Server 120, consistent with the principles of the invention, may interact with clients 110 to dynamically control user access and provide network security, as described in detail below. According to an exemplary implementation, client 110 and server 120 may perform these operations in response to their respective processors (e.g., processor 220) executing sequences of instructions contained in a computer-readable medium, such as their respective memories 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hard-wired circuitry may be used in place of or in combination with software instructions to implement processes consistent with the principles of the invention. Thus, implementations consistent with the principles of the invention are not limited to any specific combination of hardware circuitry and software.

Figure 3:
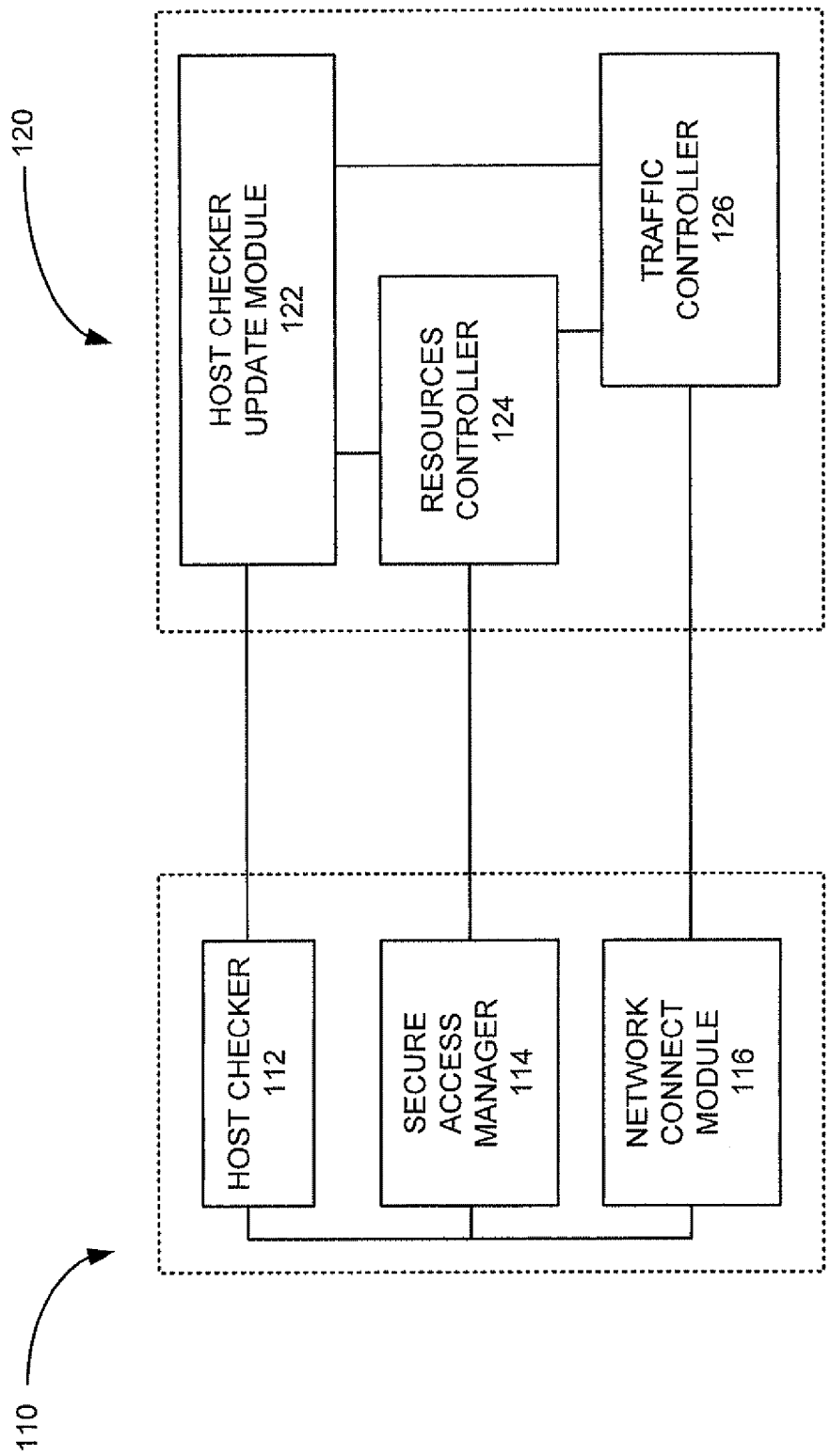
FIG. 3 is a an exemplary functional block diagram of components implemented in the client and server of FIG. 2 according to an implementation consistent with the invention.

FIG. 3 is an exemplary functional block diagram of elements implemented in clients 110 and server 120 of FIG. 1 according to an implementation consistent with the invention. Referring to FIG. 3, a single client 110 is shown for simplicity. Other clients 110 may connect to server 120 and may include the same or similar elements. Referring to FIG. 3, client 110 may include host checker 112, secure access manager 114 and network connect module 116. Each of these elements in client 110 may be implemented in, for example, software, such as via daemons or scripts stored in memory 230 and executed by processor 220. Alternatively, these elements may be implemented in hardware or a combination of hardware and software.

Host checker 112 may include logic that scans client 110 on a periodic basis to determine the status of client 110, such as whether client 110 is in compliance with various access policy rules associated with accessing server 120, accessing resources associated with server 120 and/or transmitting data to other clients in network 100. For example, host checker 112 may determine whether client 110 is running anti-virus software, anti-spyware software or other security-related software and whether any such software is current (e.g., updates have been downloaded, etc.). Host checker 112 may also determine if client 110 is sending or has sent large amounts of data to any devices, such as server 120, which may indicate that client 110 may be participating in a network attack and/or is sending spam. Host checker 112 may further detect whether client 110 has a required firewall installed and detect other conditions associated with determining whether client 110 is in compliance with various access policy rules. Such conditions may include, but are not limited to, determining whether client 110 includes various files, processes and registry values and whether client 110 includes various network ports and/or interfaces required for access to server 120.

The particular access policy rules associated with accessing server 120 and/or communicating with other clients 110 may be based on a level of access associated with a particular client 110. For example, if a particular client 110 is configured to have access to valuable information, such as company private data, or important programs being run by server 120, the particular rules associated with that client 110 may be more stringent than for another client 110 that does not have such high level access. In each case, host checker 112 may communicate with server 120 to report the status of client 110.

Secure access manager 114 may include logic that allows client 110 to form a secure connection with server 120 and access resources associated with server 120, such as data stored on server 120, programs executed by server 120, programs accessible via server 120, etc. Secure access manager 114 may also receive information from server 120 indicating whether a client/server session is to be modified (e.g., access changed, access terminated, etc.). In an exemplary implementation, secure access manager 114 may be a windows-based daemon or script that may be executed while client 110 is performing other functions.

Network connect module 116 may include logic, such as a software module, a daemon, a script or other software, that facilitates establishing a connection from client 110 to server 120 via network 130. Network connect module 116 may also be used to allow client 110 to send network traffic to other devices, such as other clients 110, server 120 and/or other devices connected to server 120.

Server 120 may include host checker update module 122, resources controller 124 and traffic controller 126. Host checker update module 122 may receive information from host checker 112 at various times and determine whether client 110 is in compliance with various access rules/policies associated with ensuring that client 110 remains in compliance after a client/server session is established. Host checker update module 122 may forward the appropriate information regarding access for client 110 to other devices in server 120. For example, host checker update 122 may forward information to resources controller 124 and traffic controller 126 based on the particular determination made regarding access by host checker update module 122.

Resources controller 124 may control access to server 120 and/or resources associated with server 120. In an exemplary implementation, resources controller 124 may receive information from host checker update module 122 and generate customized messages, such as customized revocation messages, associated with access by client 110. In one implementation, resources controller 124 may generate a customized revocation message indicating that access to one or more applications/programs executed by server 120 is to be terminated. Resources controller 124 may forward these messages to, for example, secure access manager 114, as described in detail below.

Traffic controller 126 may also receive information from host checker update module 122 and generate customized messages, such as customized revocation messages, associated with access by client 110. In one implementation, traffic controller 126 may generate a customized revocation message indicating client 110 is prohibited from sending network traffic, such as Internet protocol (IP) traffic or another type of traffic, to server 120, other clients 110 and/or other devices in network 100. Traffic controller 126 may forward these messages to, for example, network connect module 116.

Client 110 and server 120 may interact to dynamically control access by clients 110 to server 120 and various network resources, as described in detail below. In an exemplary implementation, clients 110 may be mapped to particular roles and/or include various modules, daemons, scripts, etc., based on various access privileges associated with each of clients 110 and functions performed by clients 110. For example, client 110 is illustrated in FIG. 3 as including a secure access manager 114 and a network connect module 116, as well as host checker 112. It should be understood that each client 110 may include other software and/or hardware that supports the client's roles/duties based on the particular client 110. In each case, host checker 112 may scan client 110 and provide information to server 120 to enable server 120 to dynamically control access to network resources by clients 110, as described in detail below.

Exemplary Processing

Figure 4:
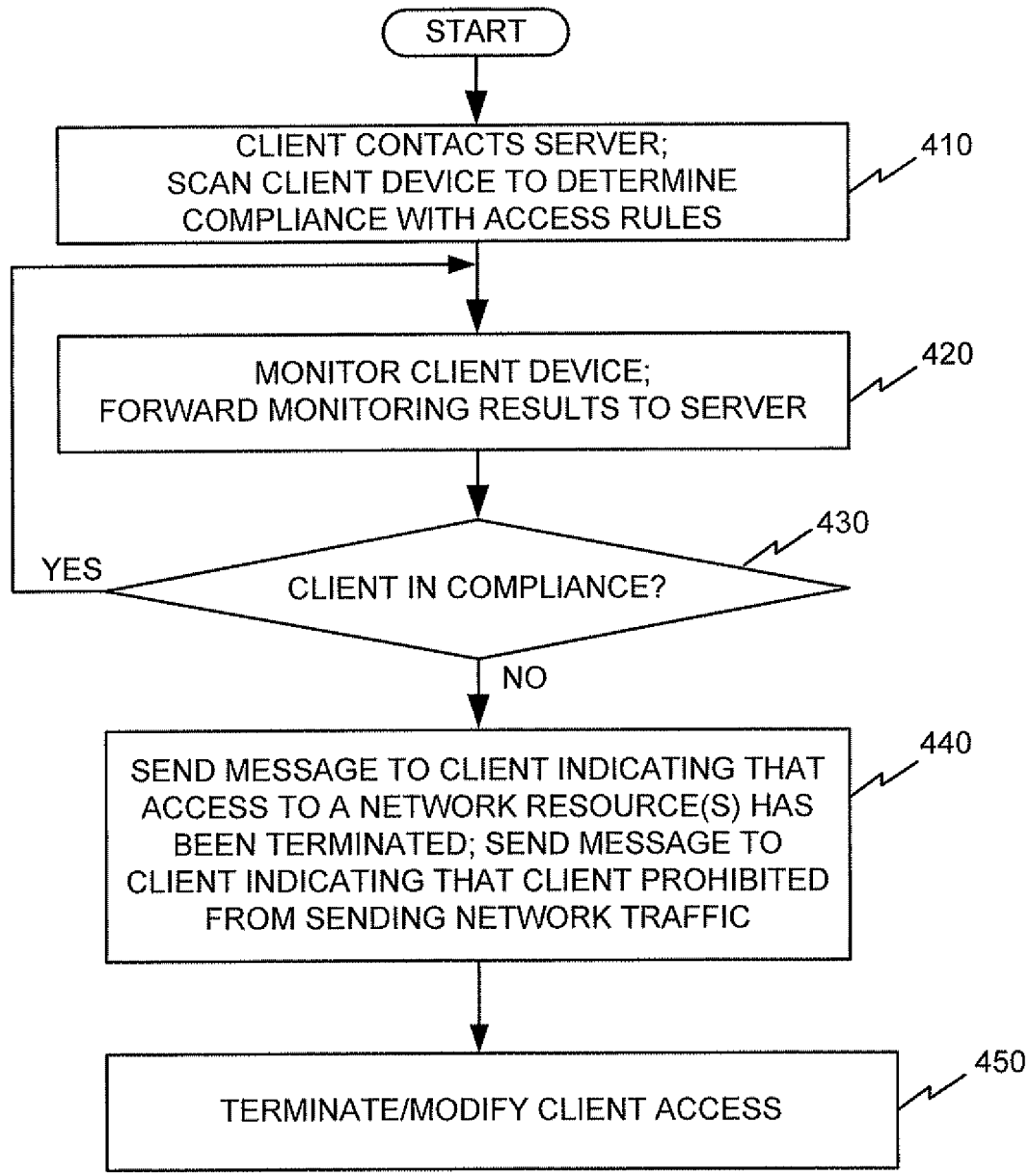
FIG. 4 is a flow diagram illustrating exemplary processing associated with providing dynamic user access management in an implementation consistent with the principles of the invention.

FIG. 4 is an exemplary flow diagram, consistent with the invention, illustrating processing associated with providing dynamic user access management. Processing may begin with client 110 accessing/contacting server 120 via network 130 (act 410). Server 120 may receive an access request and determine whether client 110 is authorized to access server 120. For example, server 120 may provide a user interface (UI) to client 110 that requires the user of client 110 to provide a user identifier, such as a user name and/or password. Alternatively, the UI may be included with secure access manager 114 and/or network connect module 116. In each case, server 120 may receive the user identifier and determine whether client 110 is authorized to access server 120.

Assume that client 110 is authorized to access server 120. Server 120 may then scan client 110 for compliance with predetermined access policy rules to determine whether client 110 is in compliance with the predetermined rules (act 410). The predetermined rules may be based on client's 110 access level associated with accessing server 120 and/or other resources associated with server 120, such as various programs executed by server 120 and/or programs accessible via server 120.

In an exemplary implementation, server 120 may run a diagnostic check on client 110 to determine if client 110 is running an anti-virus program, an anti-spyware program, or other particular program(s). Server 120 may also determine if client 110 includes various hardware, such as a firewall, in order for client 110 to access resources associated with server 120. In some implementations, client 110 (e.g., host checker 112) may execute the diagnostic check of client 110 and report the status to server 120. In each case, server 120 receives information from client 110 and determines where client 110 is in compliance with the predetermined security rules/protocols. If client 110 is in compliance, server 120 grants client 110 access to server 120 and/or resources controlled by server 120.

Figure 5:
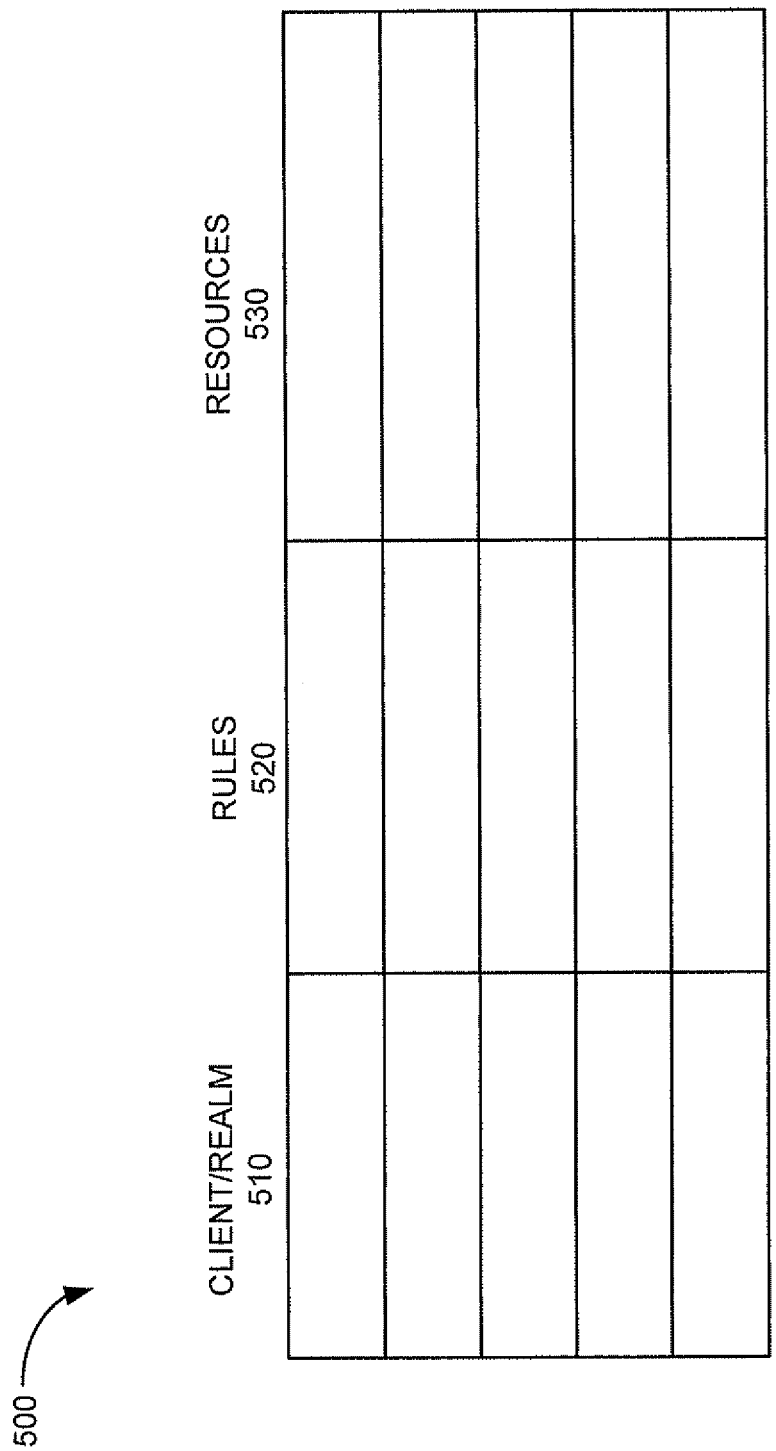
FIG. 5 is an exemplary database used by the server of FIG. 1 in an implementation consistent with the principles of the invention.

In some implementations, server 120 may store a list of resources that can be accessed by client 110. For example, FIG. 5 illustrates an exemplary database 500 that stores information associated with a number of clients. Database 500 may be stored in, for example, memory 230 (FIG. 2). Alternatively, database 500 may be stored in a memory device accessible to server 120. Referring to FIG. 5, database 500 includes a client/realm field 510, a rules field 520 and a resources field 530. Client/realm field 510 may include information identifying individual clients 110. Client/realm field 510 may also include a realm identifying a group of clients. For example, a realm could identify a group of clients 110 in a department within a company, such as "accounting department". In this case, the realm may correspond to clients 110 that are associated with users that are part of the accounting department of the company. Rules field 520 may identify particular policy rules that a device/realm identified in the corresponding client/realm field 510 must adhere to in order to have and maintain access to network resources. Resources field 530 may identify particular resources that the client identified in client/realm field 510 has access to when all security criteria are met. For example, resources field 530 may identify a particular program executed by server 120, data stored on server 120, a communication method by which client 110 may communicate with other clients 110, etc. In this manner, server 120 may provide different levels of access to various clients 110.

Once a client/server session has been established between client 110 and server 120, host checker 112 may monitor client 110 in order to ensure that client 110 complies with the predetermined rules established for maintaining access to network resources during a client/server session (act 420). For example, host checker 112 may continuously scan client 110 or periodically scan client 110 to determine whether the configuration of client 110 has changed since the client/server session has been established. The interval associated with the periodic scanning may be, for example, one minute, 10 minutes, etc., and may be programmed based on the particular requirements associated with server 120 and/or client 110. In one implementation, host checker 112 may scan client 110 to identify software being run on client 110 and also identify hardware (e.g., a firewall or other devices) included on client 110 to aid in determining whether client 110 is in compliance with the predetermined rules. Host checker 112 may forward the results of the scan of client 110 to server 120 after the scan is completed (act 420). In alternative implementations, host checker 112 may forward results of a scan of client 110 to server 120 immediately after a change in configuration (e.g., software and/or hardware change) is detected or only when a change in configuration (e.g., software and/or hardware) is detected.

In each case, server 120 receives the results of the scan from host checker 112 and forwards the results to host checker update module 122. Host checker update module 122 may then determine whether client 110 is still in compliance with the predetermined rules associated with accessing resources associated with server 120 and/or communicating with other devices, such as other clients 110 (act 430). For example, suppose that during a client/server session, the user of client 110 has removed an anti-virus software program being run on client 110. Host checker 112 identifies the removal of the anti-virus software, or the lack of an anti-virus program being run on client 110 and forwards this information to server 120. Host checker update module 122 may then check database 500 to determine if running anti-virus software is one of the rules stored in field 520 for that particular client 110.

If client 110 is still in compliance with the predetermined rules, client 110 is able to continue to access the desired resources (i.e., the resources identified in field 530) and processing returns to act 420. If host checker update module 122 determines that client 110 is no longer in compliance, host checker update module 122 may send information to resources controller 124 and/or traffic controller 126 indicating that client 110 is no longer in compliance. For example, assume that running anti-virus software is one of the rules stored in rules field 520 for client 110 and that client 110 no longer includes anti-virus software. In this case, host checker update module 122 may send information to resources controller 124 indicating that server 120 (or client 110) must terminate the client/server session and/or prohibit access to one or more of the resources identified in resources field 530. Resources controller 124 may then send a message to client 110 indicating that server 120 has terminated the client/server session as a result of a potential security issue and/or terminate access to one or more of the resources (act 440).

For example, in one implementation, resources controller 124 may send a customized revocation message indicating that access by client 110 to one or more programs executed by server 120 is being revoked or terminated. This customized revocation message may also indicate that client 110 is prohibited from accessing the desired resources until the client's 110 security compliance meets the requirements of server 120 and client 110 has sufficient access privileges. For example, the customized revocation message may indicate that a particular program must be installed/re-installed on client 110, such as an anti-virus program, in order for client 110 to regain access to the desired resources. In this manner, the user of client 110 is able to quickly ascertain why access is being revoked.

Depending on particular security issue (e.g., which rules client 110 is no longer in compliance with), host checker update module 122 may also send information to traffic controller 126 indicating that client 110 is prohibited from sending network traffic to server 120 and/or other clients 110 that may be part of for example, a company network/intranet. In this case, traffic controller 126 may send a customized revocation message to network connection module 116 indicating that the client/server session is terminated and/or that client 110 is prohibited from sending network traffic to other clients 110, such as other clients 110 associated with server 120 and/or network 100 (act 440).

Server 120 may also terminate access to the particular resource(s) (act 450). For example, server 120 may terminate access to one or more network resources and/or prohibit client 110 from sending network traffic to other clients. For example, server 120 may prohibit access to a particular resource/application based on the particular security violation. Server 120 may also prohibit client 110 from transmitting network traffic. For example, in one implementation, each of clients 110 may be accessed via server 120. Therefore, in this implementation, server 120 may prohibit access to each of clients 110 in network 100 by other network devices, including prohibiting the sending of network traffic to one of clients 110 by another client 110.

In other cases, server 120 may modify access by client 110 (act 450). For example, server 120 may terminate access to a particular program/application, while continuing to allow access to other programs/applications and/or allowing client 110 to transmit network traffic to other clients 110. In this manner, server 120 may selectively revoke client access to one or more programs and/or services based on the particular circumstances.

As described above, server 120 may perform evaluation of one or more clients 110 with respect to predetermined security axles/policies based on a triggering event from client 110. That is, server 120 may evaluate client 110 based on information received from a host checker 112 executed by client 110, where server 120 does not initiate or trigger the scan performed by client 110.

In other implementations, server 120 may trigger scans of clients 110 at periodic intervals, such as every 1 minute, 10 minutes, etc., by sending messages to one or more clients 110. The particular interval may be programmable. In some implementations, server 120 may trigger a policy evaluation of a number of clients 110. For example, server 120 may send a policy reevaluation message to a number of clients 110 included in a realm or to all clients 110 included in network 100. In this implementation, a realm identifier (ID) may be included in the policy re-evaluation message. If no realm ID is included in the policy re-evaluation message, all realms may be re-evaluated. That is, host checker 112 included in each client 110 that receives the re-evaluation message will execute a scan of its software/hardware and report results of the scan to server 120.

In still other implementations, a user ID may be included in a policy evaluation message sent to a client. If the user ID does not match the user ID associated with a client 110 that receives the message, that client 110 may ignore the message. In other instances, if a user ID is not included in a policy re-evaluation message, each client 110 that receives the message may perform a scan of its software/hardware.

In some implementations, server 120 may trigger a policy evaluation/re-evaluation with respect to particular role or function performed by one or more clients 110 and/or a module executed by one or more clients 110. For example, server 120 may send a role/function/module policy re-evaluation message to a number of clients 110 included in a realm or to all clients 110 connected to network 100. In this implementation, the clients 110 that receive the role/function/module policy re-evaluation message may perform a scan to identify particular security related hardware/software associated with this particular role/function/module. For example, if the policy re-evaluation message is associated with sending network traffic, client 110 may scan or evaluate security related software/hardware associated with transmitting network traffic via, for example, network connect module 116. Client 110 may then report the results of the scan to server 120. In this manner, a policy re-evaluation message may be targeted to a particular function or role performed by client 110.

In some implementations, a user ID may be included in the role/function/module policy re-evaluation message to enable server 120 to identify particular clients 110 that will respond to this message. This further enables server 120 to tailor specific messages to particular clients.

In still other implementations, client 110 may perform a scan of particular roles, functions and/or modules on client 110 without input from server 120. That is, host checker 112 may be configured to perform particularized scans of various roles, functions or modules of client 110. Such scans may be based on criticality or importance associated with particular modules or functions on client 110. In still other implementations, host checker 112 may perform scans associated with various functions or modules on different schedules. In this manner, host checker 112 may perform scans associated with more important functions or modules more frequently than for other functions/modules.

CONCLUSION

Systems and methods consistent with the invention enable a server to dynamically control access to network resources during a communication session with a client device during the communication session. Aspects consistent with the invention allow the server to terminate access to one or more network resources based on information received from a client device during the communication session. Advantageously, this may permit a server to reduce risk associated with network attacks.

In this disclosure, there is shown and described the preferred embodiments of the invention, but, as aforementioned, it is to be understood that the invention is capable of use in various other combinations and environments and is capable of changes or modifications within the scope of the inventive concept as expressed herein.

For example, implementations consistent with the principles of the invention have been described with examples of a client device including particular modules associated with performing various functions. It should be understood that client devices may include other software and/or hardware based on the particular client requirements.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software, such as a processor/microprocessor executing instructions stored in a memory.

In addition, series of acts have been described with respect to FIG. 4. The order of the acts may be varied in other implementations consistent with the invention. Moreover, non-dependent acts may be performed in parallel. Further, the invention is not limited to any specific combination of hardware circuitry and/or software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed:

1. A method for managing access to network resources by a first network device, comprising:
   establishing, by a processor, a communication session with the first network device, the communication session providing the first network device with access to the network resources;
   receiving, by the processor, information from the first network device during the communication session, the information indicating that the first network device is not in compliance with at least one security-related rule; and
   determining, by the processor, whether to modify access by the first network device to at least one of the network resources based on the received information.

2. The method of claim 1, further comprising:
   sending a message to the first network device when the determining determines that access to a first one of the at least one network resources is to be modified, the message indicating that access by the first network device to the first network resource is prohibited.

3. The method of claim 2, where the method further comprises:
   continuing to allow the first network device to access at least one other network resource of the network resources while access to the first network resource is prohibited.

4. The method of claim 1, further comprising:
   receiving information from the first network device at periodic intervals during the communication session, the information indicating a status of at least one of software or hardware included on the first network device; and
   determining, at the periodic intervals, whether to modify access by the first network device to at least one of the network resources in response to the received information.

5. The method of claim 1, where the receiving information is triggered by a change in configuration of the first network device.

6. The method of claim 1, where the receiving information is triggered in response to a timer at the first network device reaching a predetermined value.

7. The method of claim 1, further comprising:
   initiating a re-evaluation of access to network resources by a plurality of network devices in response to the received information.

8. The method of claim 1, further comprising:
   storing information associated with a plurality of network devices, the information identifying a plurality of security rules associated with managing access to network resources by the plurality of network devices.

9. The method of claim 8, where the determining comprises:
determining whether the first network device complies with the at least one security-related rule based on the stored information.

10. A system, comprising:
a memory to store security-related rules; and
a processor coupled to the memory, the processor to:
establish a client session with a first client device, the client session providing the first client device with access to at least one resource,
receive information from the first client device during the client session, the information indicating that the first client device is not in compliance with at client device has changed, and
determine whether to modify access by the first client device to the at least one resource based on the received information and the information stored in the memory.

11. The system of claim 10, where the at least one security-related rule comprises information identifying at least one of anti-virus software or anti-spyware software associated with accessing the at least one resource.

12. The system of claim 10, where when receiving information, the processor is to receive information indicating that the configuration of at least one of hardware or software associated with the first client device has changed.

13. The system of claim 10, where the memory is further to:
store information associated with a plurality of client devices, the information identifying a plurality of security-related rules associated with managing access to resources by the plurality of client devices.

14. The system of claim 10, where the at least one resource comprises a plurality of resources, and the processor is further to:
generate a message to the first client device when the processor determines that access to a first one of the plurality of resources is to be modified, the message indicating that access by the first client device to the first resource is prohibited, and
terminate access by the first client device to the first resource,
the system further comprising:
a transmit device to transmit the message to the first client device.

15. The system of claim 14, where the message does not affect access by the first client device to resources other than the first resource.

16. The system of claim 14, where the message indicates why access to the first resource is prohibited.

17. The system of claim 10, where the processor is further to:
receive information from the first client device at periodic intervals during the client session, the information indicating a status of at least one of software or hardware included on the first client device, and
determine, at the periodic intervals, whether to modify access by the first client device to at least one of the network resources in response to the received information.

18. The system of claim 10, where the processor is further to:
generate a message to re-evaluate access by a plurality of client devices to network resources in response to the received information, the system further including:
a transmit device configured to transmit the message to the plurality of client devices.

19. The system of claim 18, where the message includes an identifier identifying the plurality of client devices.

20. The system of claim 18, where the message identifies a function or role performed by at least some of the plurality of client devices.

21. The system of claim 10, where the processor is to receive the information from the first client device in response to a triggering event at the first client device.

22. A system, comprising:
a memory to store instructions; and
a processor to execute the instructions to implement:
means for establishing a client-sever session with a first client device, the client-server session providing the first client device with access to at least one network service or resource;
means for receiving information from the first client device during the client-server session, the information indicating that the first client device is not in compliance with at least one security-related rule or that a configuration of the first client device has changed; and
means for determining whether to modify access by the first client device to the at least one network service or resource based on the received information.

23. The system of claim 22, further comprising:
means for initiating re-evaluation of access associated with a plurality of client devices based on the received information.

24. A network device, comprising:
a processor to:
establish a client-server session with a server, the client-server session providing the network device with access to one or more network resources,
periodically scan the network device during the client-server session to identify a status associated with at least one of hardware or software included on the network device, the periodic scanning being triggered by the network device, and
report the status associated with the network device to the server.

25. The network device of claim 24, where the processor is further to:
identify a change in configuration of the network device, and
when reporting the status, the processor is to:
report the status associated with the network device in response to the identified change in configuration of the network device.

26. A computer-readable memory device having stored thereon sequences of instructions which, when executed by a processor of a network device, cause the processor to:
establish a communication session with a server controlling access to a plurality of resources, the communication session providing the network device with access to the plurality of resources;
periodically scan the network device during the communication session to identify a status associated with at least one of hardware or software included on the network device, the periodic scanning being triggered by the network device and not by a command from the server; and
report the status associated with the network device to the server.

27. The computer-readable memory device of claim 26, where the instructions cause the processor to report the status associated with the network device in response to at least one of a hardware or software change associated with the network device.

\* \* \* \* \*

UNITED STATES PATENT AND TRADEMARK OFFICE
CERTIFICATE OF CORRECTION

| | | |
|---|---|---|
| PATENT NO. | : 8,601,102 B1 | Page 1 of 1 |
| APPLICATION NO. | : 11/421294 | |
| DATED | : December 3, 2013 | |
| INVENTOR(S) | : Chi-Cheng Lee et al. | |

It is certified that error appears in the above-identified patent and that said Letters Patent is hereby corrected as shown below:

In the Claims

Please correct Claim 10 (Column 11, Lines 16 and 17) as follows:

"the first client device is not in compliance with at client device has changed, and"

should read:

--first client device is not in compliance with at least one security-related rule stored in the memory or that the configuration of the first client device has changed, and--

Signed and Sealed this
Eighteenth Day of March, 2014

Michelle K. Lee
*Deputy Director of the United States Patent and Trademark Office*